May 21, 1946.  E. H. SANDBERG  2,400,715
MICROMETER HEIGHT GAUGE
Filed Oct. 27, 1943
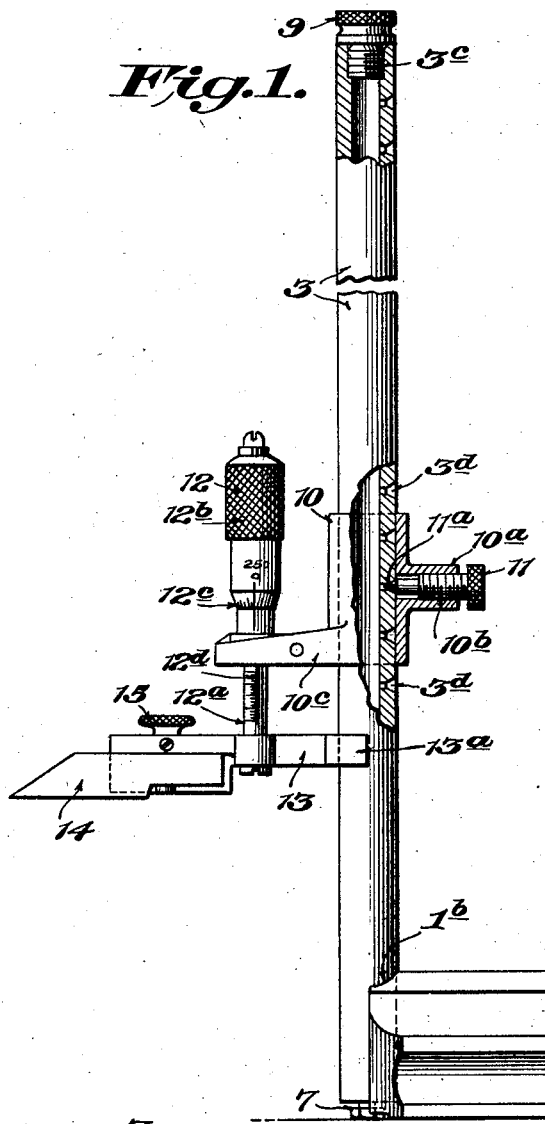
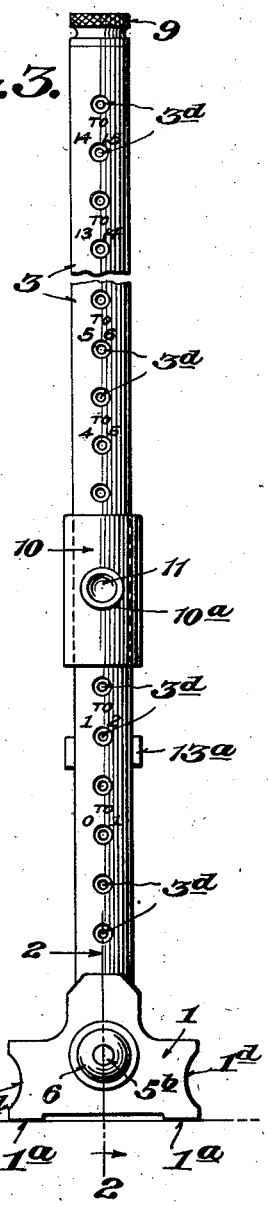
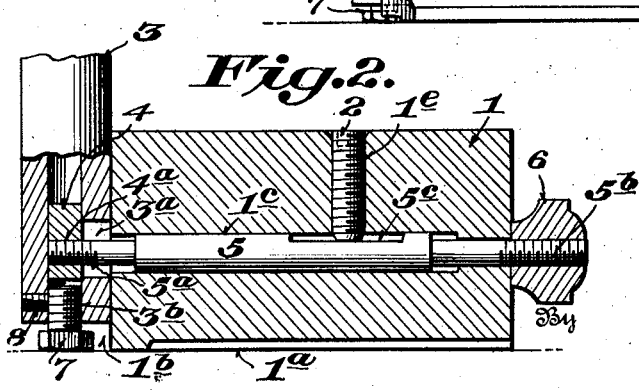

Patented May 21, 1946

2,400,715

UNITED STATES PATENT OFFICE 2,400,715

MICROMETER HEIGHT GAUGE

Ernest H. Sandberg, Long Beach, Calif.

Application October 27, 1943, Serial No. 507,826

11 Claims. (Cl. 33—170)

This invention is a novel micrometer height gauge, and the principal object thereof is to provide a height gauge of the above type which is simple in construction and operation, and which embodies certain novel features hereinafter set forth.

I will explain the invention with reference to the accompanying drawing, which illustrates one practical embodiment thereof to enable others familiar with the art to adopt and use the same; and will summarize in the claims the novel features of construction, and novel combinations of parts, for which protection is desired.

In said drawing:

Fig. 1 is a side elevation, partly in section, of my novel micrometer height gauge.

Fig. 2 is an enlarged vertical section through the base on the line 2—2, Fig. 3.

Fig. 3 is an end elevation of the height gauge.

As shown, the gauge preferably comprises a base 1 consisting of a block of inverted T-shaped cross-section having a milled lower surface 1a, said base being relatively heavy, and having a substantially semi-circular vertically disposed recess 1b at one end for the purpose hereinafter set forth. Preferably the sides of base 1 are grooved as at 1d, Fig. 3, to facilitate lifting or handling, the grooves preventing slipping of the fingers thereon.

Extending horizontally through base 1 is a bore 1c registering with the axis of semi-circular recess 1b; and extending vertically into base 1 is a tapped bore 1e (Fig. 2) adapted to receive a set screw 2, bore 1e registering with the horizontal bore 1c.

Secured in the semi-circular recess 1b is a vertical post 3, preferably of cylindrical shape, said post being hollow and having a lateral opening 3a (Fig. 2) adjacent its lower end opposite bore 1c. Within the bore of post 2 opposite lateral opening 3a is a block 4 (Fig. 2) having a tapped bore 4a therein adapted to receive the threaded end 5a of an anchoring pin 5 which makes a sliding fit within the horizontal bore 1c of base 1, and which pin 5 extends through the lateral opening 3a of post 3, said pin 5 extending beyond the opposite end of base 1 and being threaded as at 5b to receive a nut 6, whereby post 3 may be securely clamped in position within the semi-circular recess 1b. In order to prevent the pin 5 from rotating while nut 6 is being tightened, the pin is provided with a slot or recess 5c (Fig. 2) adapted to receive the inner end of set screw 2.

Post 3 is of height to suit the particular work which is to be gauged; and the lower end thereof is threaded as at 3b to receive a cap screw 7, Figs. 1 and 2, which not only closes the lower end thereof but also serves to adjust the post 3 with respect to the base 1 so that the micrometer readings will be accurate, said screw 7 being locked in bore 3b by means of a set screw 8 which is threaded in a tapped bore in the side of the post 3 adjacent its lower end registering with the threaded portion 3b of the post. The upper end of the bore of post 3 is threaded as at 3c to receive a cap screw 9 normally closing the upper end thereof, cap screw 9 not only protecting the upper end of post 3, but also when removed providing for the use of one or more extension posts (not shown) mounted on top of the main post 3.

The side of post 3 facing base 1 is provided with a spaced series of conical recesses 3d (Fig. 3) preferably spaced exactly ½ (0.500″) inch apart, the series extending from a point adjacent the base 1 to the upper end of the post; and as shown the alternate recesses 3d from the lower end to the upper are marked "0 to 1," "1 to 2," "2 to 3," etc., as indicated.

Slidably mounted upon post 3 is a collar 10 of width sufficient to embrace a plurality of recesses 3d, said collar making a sliding fit thereon so as to avoid play between the collar and post. Extending from the side of collar 10 facing the base 1 is a lateral projection 10a which has a tapped bore 10b receiving a clamping screw 11 having a threaded shank engaging the tapped bore 10b and having a reduced inner end terminating in a cone-shaped point 11a conforming in shape with the conical recesses 3d of post 3, whereby when the clamping screw 11 is engaged with any of the recesses 3d the same will tightly lock the collar 10 on the post eliminating play or movement between the collar and post, the clamping screw 11 being engageable with any of the recesses of the series.

Collar 10 also carries a lateral projection 10c (Fig. 1) at the side opposite from the projection 10a, said projection 10c extending from the lower end of the collar and carrying therein a vertically disposed micrometer screw of commercial form indicated by the numeral 12, said micrometer screw being preferably an ordinary one inch inside micrometer and forming no part of my present invention, same having a shank 12a which is vertically movable upon rotation of the rotary head 12b, the head 12b carrying micrometer graduations 12c, and the shank carrying a scale 12d.

Secured to the lower end of bolt 12a of micrometer 12 is a scriber guide 13 having a semi-circular inner end 13a conforming with the external curvature of post 3 with which same contacts so as to be guided against the post while at the same time preventing rotation of the guide with respect thereto, such arrangement maintaining the guide 13 in alignment with the axis of base 1 for any adjusted position of the shank 12a and the collar 10. A scriber 14 is secured in fixed position on the guide 13 by means of a thumb screw 15.

The above construction provides a simple and efficient assembly in which the post 3 may be initially adjusted for accuracy of the series of recesses 3d with respect to the base 1 by adjusting the cap screw 7, the lateral opening 3a in post 3 being of sufficient size to permit said adjustment, the head of screw 7 lying in the plane of the milled lower face of base 1 when in proper adjustment to prevent shifting of parts due to handling. The arrangement also permits the use of one or more extension posts (not shown) which may be engaged in the tapped bore 3c at the upper end of post 3 when their use is desired to increase the length of the post, said extension posts being recessed similarly to the post 3 to receive the screw 11.

Since the recesses 3d in post 3 are disposed exactly ½ inch apart and snugly receive the correspondingly shaped end of screw 11 to clamp the micrometer supporting collar 10 in exact position thereon, and since the recesses 3d in the post are conveniently lettered as to height (in inches) with respect to the base and are disposed ½ inch apart, it is an easy matter for the user to initially set or adjust collar 10 to approximately ½ inch of the desired height on the post, and then by use of the micrometer 12 to adjust the scriber to the desired fraction of ½ inch.

I do not limit my invention to the exact form shown in the drawing, for obviously changes may be made therein within the scope of the claims.

I claim:

1. A height gauge, comprising a base having a plane face; a post mounted thereon normal to the said face and having a recess therein; an axially extensible member in the post adjacent the base for axially adjusting the post on said base; a collar slidably mounted on said post and having means adapted to engage said recess; a micrometer carried by said collar having a movable shank disposed parallel with said post; and a scriber carried by said shank extending parallel with the plane face of the base.

2. A height gauge, comprising a base having a plane face; a post mounted thereon normal to the said face and having a recess therein; means for axially adjusting the post on said base; a collar slidably mounted on said post and having means adapted to engage said recess; a micrometer carried by said collar having a movable shank disposed parallel with said post; a scriber carried by said shank extending parallel with the plane face of the base; said base having a bore extending therethrough parallel with said plane face, and having a recess in one face opposite to and registering with said bore; said post being hollow and having an enlarged opening therein opposite said bore; a filler movably mounted in said post having a tapped bore opposite the opening; a pin in said bore of the base having a threaded end passing through the opening and engaging the tapped bore of said filler; and means on the opposite end of the pin for drawing the post into said recesses to frictionally secure the post therein.

3. In a gauge as set forth in claim 1, said post adjusting means comprising a threaded member mounted on the end of the post adjacent the base and having a portion normally lying in the said plane face for adjusting the post with respect to the base.

4. A height gauge, comprising a base having a plane face; a post mounted thereon normal to the said face and having a series of evenly spaced recesses therein; an axially extensible member in the post adjacent the base for axially adjusting the post on said base; a collar slidably mounted on said post; means on said collar adapted to enter any one of said series of recesses; a micrometer carried by said collar having a movable shank disposed parallel with said post; and a scriber carried by said shank extending parallel with said plane face of the base.

5. In a gauge as set forth in claim 4, said base having a bore extending therethrough parallel with said plane face, and having a recess in one face opposite to and registering with said bore; said post being hollow and having an enlarged opening therein opposite said bore; a filler movably mounted in said post having a tapped bore opposite the opening; a pin in said bore of the base having a threaded end passing through the opening and engaging the tapped bore of said filler; and means on the opposite end of the pin for drawing the post into said recess to frictionally secure the post therein.

6. In a gauge as set forth in claim 4, said post adjusting means comprising a threaded member mounted on the end of the post adjacent the base and having a portion normally lying in the said plane face for adjusting the post with respect to the base.

7. A height gauge, comprising a base having a plane face; a post mounted thereon normal to the said face and having a series of evenly spaced recesses therein; means for axially adjusting the post on said base; a collar slidably mounted on said post; means on said collar adapted to enter any one of said series of recesses; a micrometer carried by said collar having a movable shank disposed parallel with said post; a scriber carried by said shank extending parallel with said plane face of the base; said base having a bore extending therethrough parallel with said plane face, and having a semi-circular recess in one face opposite to and registering with the bore; said post being hollow and having an enlarged opening therein opposite said bore; a filler movably mounted in said post having a tapped bore opposite the opening; a pin having a threaded end passing through the opening and engaging the tapped bore of said filler; means on the opposite end of the pin for drawing the post into said semi-circular recesses; and said post adjusting means comprising a head tapped into the adjacent end of the post and having a portion normally lying in the plane face for adjusting the post with respect to the base.

8. A height gauge, comprising a base having a plane face; a post mounted thereon normal to the said face and having a series of evenly spaced recesses therein; an axially extensible member in the post adjacent the base for axially adjusting the post on said base; a collar slidably mounted on said post; means on said collar adapted to enter any one of said series of recesses; a micrometer carried by said collar having a movable shank disposed parallel with said post; a guide carried by said shank and having a portion conforming with and contacting the said post; and a scriber carried by said guide and disposed parallel with said plane face of the base.

9. In a gauge as set forth in claim 8, said base having a bore extending therethrough parallel with said plane face, and having a recess in one face opposite to and registering with said bore; said post being hollow and having an enlarged opening therein opposite said bore; a filler movably mounted in said post having a tapped bore opposite the opening; a pin in said bore of the base having a threaded end passing through the opening and engaging the tapped bore of said filler; and means on the opposite end of the pin for drawing the post into said recess to frictionally secure the post therein.

10. A height gauge, comprising a base having a plane face; a post mounted thereon normal to the said face and having a series of evenly spaced recesses therein; an axially extensible member in the post adjacent the base for axially adjusting the post on said base; a collar slidably mounted on said post; means on said collar adapted to enter any one of said series of recesses; a micrometer carried by said collar having a movable shank disposed parallel with said post; a guide carried by said shank and having a portion conforming with and contacting the said post; a scriber carried by said guide and disposed parallel with said plane face of the base; said base having a bore extending therethrough parallel with said plane face, and having a semi-circular recess in one face opposite to and registering with the bore; said post being hollow and having an enlarged opening therein opposite said bore; a filler movably mounted in said post having a tapped bore opposite the opening; a pin having a threaded end passing through the opening and engaging the tapped bore of said filler; means on the opposite end of the pin for drawing the post into said semi-circular recesses; and said post adjusting means comprising a head tapped into the adjacent end of the post and having a portion normally lying in the plane face for adjusting the post with respect to the base.

11. In a height gauge including a base, a post, and a micrometer adjustably mounted on said post; said base having a bore extending therethrough and having a recess in one face registering with the bore; said post being hollow and having an enlarged opening therein opposite said bore; a filler movably mounted in said post having a tapped bore opposite the opening; a pin having a threaded end passing through the opening and engaging the tapped bore of said filler; and means on the opposite end of the pin for drawing the post into said recesses to frictionally secure the post therein; and a head threaded on the adjacent end of the post and having a portion normally lying in the plane of the base for adjusting the post with respect to the base.

ERNEST H. SANDBERG.